March 5, 1940.   W. M. YOUNG   2,192,659
SELF-ACTING REGULATOR
Filed Aug. 17, 1937   2 Sheets-Sheet 1
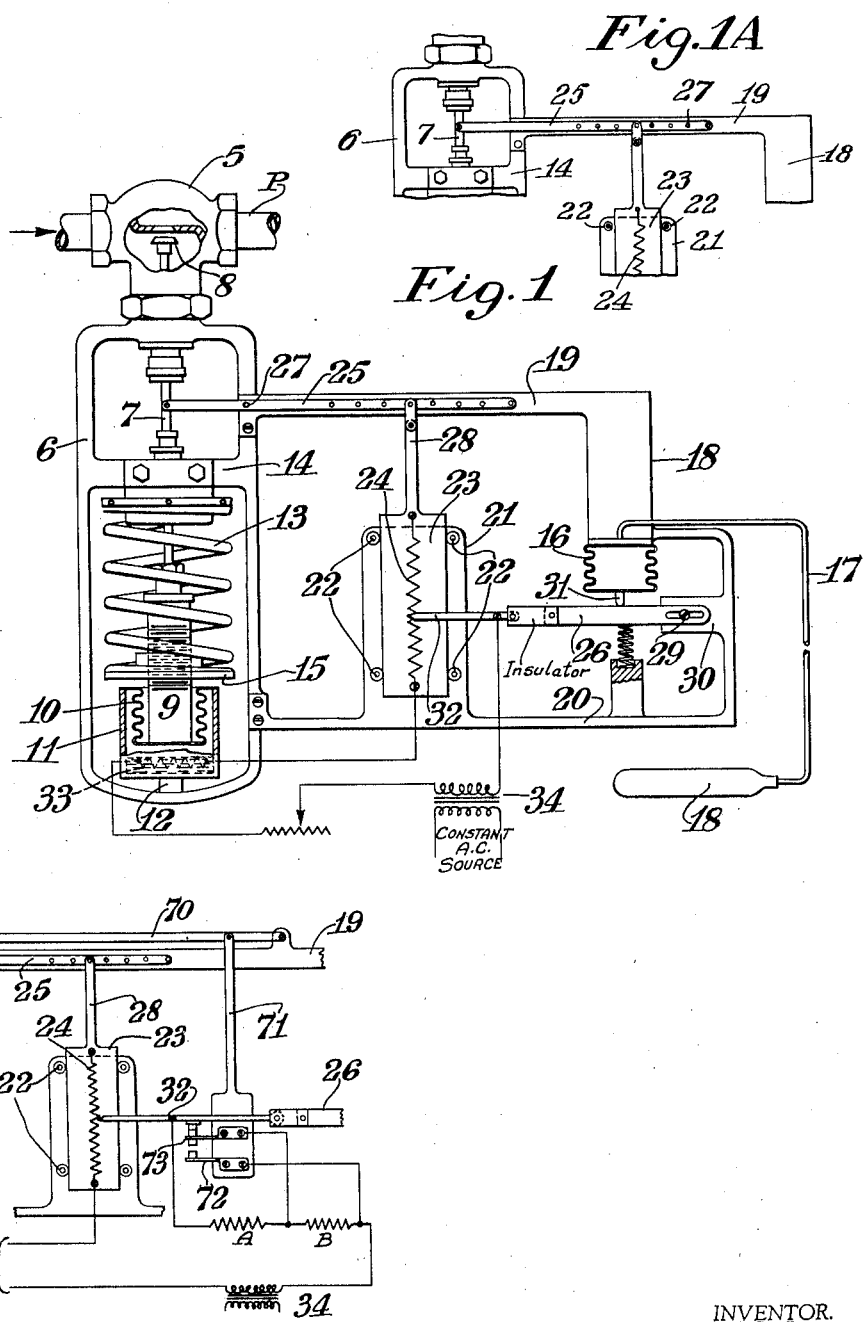
INVENTOR.
WILLIAM M. YOUNG
BY D. Clyde Jones
ATTORNEY.

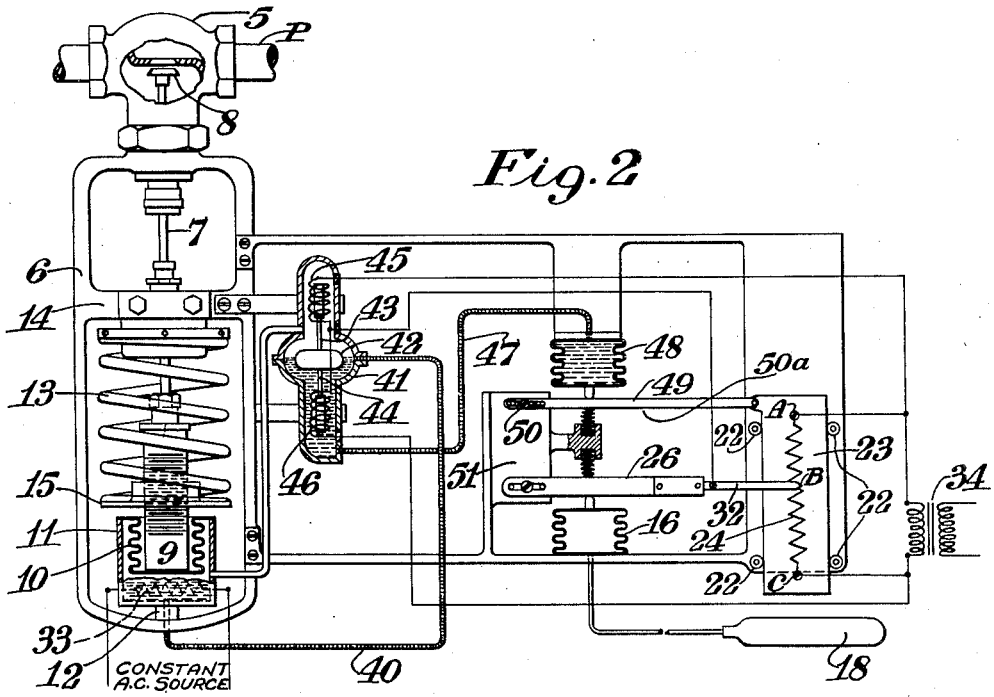

Patented Mar. 5, 1940

2,192,659

UNITED STATES PATENT OFFICE 2,192,659

SELF-ACTING REGULATOR

William M. Young, Rochester, N. Y., assignor to Taylor Instrument Companies, Rochester, N. Y., a corporation of New York Application August 17, 1937, Serial No. 159,535

7 Claims. (Cl. 236—68)

This invention relates to regulators and more particularly to regulators of the type which obviate the need of a separate source of controlled pressure fluid for motivating the valve of the regulator.

In accordance with the present invention it is proposed to actuate a regulating device or the like by the vapor pressure which is developed by the application of heat to a vaporizable liquid included in the device, the amount of vapor pressure developed thereby being proportional to a deviation in the temperature or other condition which it is desired to maintain.

The various features and advantages of the invention will appear from the detailed description and claims when taken with the drawings in which Fig. 1 is a diagrammatic showing of one form of the invention; Fig. 1A is an abbreviated view showing a different adjustment of the device of Fig. 1; Fig. 2 is likewise a diagrammatic showing of a modified form of the invention; and Fig. 3 is also a diagrammatic showing of a further modified form of the invention. Fig. 4 is an attachment for use with the devices of Figs. 1 and 3.

Referring to Fig. 1, there is illustrated a valve body 5 connected in a pipe P through which a regulating medium flows to maintain the desired condition. The valve body has mounted thereon, a frame 6 having suitable guides (not shown) in which a valve stem 7 provided with a valve disc 8 is adapted for lengthwise motion. The valve stem 7 at the lower end thereof, as illustrated, is provided with a valve stem extension 9 to which there is secured a metal bellows 10, in turn, connected by a liquid-tight joint to the rim of a cup 11 herein referred to as a boiler. The cup or boiler has its closed end rigidly connected at 12 to the frame 6 and is partially filled with a liquid which develops a relatively high vapor pressure when vaporized by the application of heat thereto. A coil spring 13 enclosing the valve stem and its extension, has one end engaging a cross bar 14 of the frame 6 and has its other end engaging a disc or washer 15 attached to the valve stem extension 9. Thus when the vapor pressure increases the bellows 10 expands and the valve stem extension 9 and the valve stem 7 move the valve disc 8 against the action of the spring 13 to close the valve. However, when the vapor pressure in the boiler decreases, the spring 13 tends to open the valve. It will be understood, however, that the spring may be arranged to close the valve in which case the pressure in the boiler may be effective to open the valve.

The regulator also includes a condition-sensing unit such as a tube system comprising a pressure responsive unit 16 which may be in the form of a metal bellows, and a capillary tube 17 communicating therewith and also communicating with a bulb 18 which is subjected to the temperature or other condition that is to be maintained at a desired value. This tube system may be filled with a liquid or with a liquid and its vapor. The bellows of the tube system is supported on a U-shaped bracket comprised of a vertical portion 18 and horizontal arms 19 and 20 mounted on the frame 6. The arm 20 of the bracket carries an upright 21 provided with guide rolls 22 between which a plate 23 bearing a resistor 24 is adapted to slide. A lever 25 which has a series of openings therein adapted to receive a pivot 27 mounted in corresponding holes in the frame or its bracket, is pivotally connected at one end to the valve stem 7 and is pivotally connected adjacent its other end to an extension 28 on the plate 23. A lever 26 pivoted at one end on lug 30 of the bracket, has its intermediate portion in contact with a projection 31 on the bellows 16, and is provided at its free end with an insulatedly mounted brush or contactor 32 adapted to engage the various turns of the resistor 24.

Within the boiler there is provided an electrical heating unit 33 serially included in a circuit to be described, including the secondary winding of a transformer 34, the primary of which is connectible to a constant alternating current source.

In the operation of the device the primary winding is connected in circuit with said current source. Let it be assumed that the temperature at the bulb 18 rises so that the filling medium in the tube system causes the bellows 16 to expand. This, in turn, causes the brush or contactor 32 of the rheostat to move downwards and thereby to reduce the resistance in the circuit including the heater 33. This permits more current to flow through the heater and the resulting increase in heat causes the liquid in the boiler 11 to vaporize. The vapor pressure thus developed forces the valve stem 7 upward against the tension of the spring 13, thus tending to close the valve 8. As the valve stem moves upward, the lever 25 pivoted thereto, swings clockwise about its pivot 27 to lower the plate 23 carrying the resistor 24 with respect to contactor 32 and thus reintroduces a certain number of turns thereof in the circuit of the boiler. As a result of this, current through the heater in the boiler tends to decrease slightly and some of the vapor in the boiler liquefies to reduce the vapor pressure therein a slight amount. The spring 13 is thus enabled to open up the valve disc 8 a slight amount. The connection between the valve stem and the resistor plate 23 through lever 24 insures that the system will have a degree of precision action so that the valve disc will tend to be correctly positioned in spite of valve stem friction and other agencies tending to introduce inaccuracies in operation. It will be appreciated that by locating the pivot 27 at the right of the extension 28, (Fig. 1A), instead of to the left thereof, the plate 23 will be elevated when the valve stem rises so that an increased current flows through the heater in the boiler. Thus more liquid will vaporize and a further rise of the valve stem will be effected. This recycling will continue until the predetermined temperature is restored.

An analysis of the movement just referred to, 27 being to the left of 28, shows that on an increase in temperature at the bulb 18, there is immediately introduced into the boiler a relatively large amount of heat to effect a prompt movement of the valve stem. However, as soon as the valve stem moves, the amount of heat required in the boiler to maintain the desired control effect at the bulb 18, is less than the amount required initially to vaporize the liquid in the boiler and to raise the temperature of the metal parts associated therewith. It will thus be seen that it is desirable to decrease the current to the boiler after the initial movement of the valve stem and the linkage just described is effective to accomplish this result. The arrangement of the present invention thus possesses an anticipating response in that it effects a large primary or initial operation followed by a subsequent reduction in this operation.

A drop in pressure at the bulb 18 causes the system to operate in a similar manner but in the opposite sense.

It will also be understood that by having a different portion of the slot in lever 26 engage the pivot 29, the sensitivity of the system to changes at bulb 18 will be changed.

The structure of the device in the modified system of Fig. 2 is similar to that shown in Fig. 1, except that the boiler 11 is supplied with a constant heat input by means of an electrical heating coil 33 which is connected to a substantially constant source of alternating current. The boiler in this device is connected by a conduit 40 to an intermediate point on a reservoir 41. This reservoir contains a float 42 having upwardly and downwardly extending arms 43 and 44 terminating in solenoid cores respectively enclosed by the solenoids 45 and 46. The conduit or capillary tube 40 and the lower portion of the reservoir contain a liquid substantially at the level indicated in dotted lines. The lower portion of the reservoir is connected by a conduit 47 to a metal bellows 48. A projection on this bellows engages an intermediate point on a lever 49 which has one end adjustably pivoted at 50 on an arm 51 carried by the bracket, the other end of this lever being pivotally connected to plate 23. The resistor 24 and its contactor 32 are connected to the solenoid coils 45 and 46 to constitute a bridge network. The remaining portions of the device which is substantially similar to that already described, are identified by the same reference characters.

In the operation of this modified system alternating current is supplied from a substantially constant source to the heating coil 33. Let it be assumed that there is a temperature increase at the bulb 18. The filling medium in this bulb and the bellows 16 expands. The bellows 16 is thus caused to move the lever 26 counterclockwise, thereby moving the wiper or contactor 32 upward. This decreases the resistance in the section A, B of the bridge network and since this section is connected in parallel with the solenoid 45, the current therethrough decreases. However, the resistance in the section B, C of the network is simultaneously increased and a greater flow of current through the solenoid 46 results. The solenoids 45 and 46 are thereby effective to pull the float 42 downwards to displace some of the volatile liquid from the reservoir 41 and through the conduit 40 into the boiler 11. The liquid thus introduced into the boiler vaporizes and increases the vapor pressure therein. This increased vapor pressure compresses the bellows 10 causing it to elevate the valve stem extension 9 and the valve stem 7 upward tending to close the valve disc 8. The increased pressure in the boiler is also transmitted through the conduit 40 and the reservoir 41 as well as the conduit 47, to the bellows 48. This bellows expands and in so doing forces the lever 49 in a clockwise direction. This moves the plate 23 downward and since the contactor 32 remains stationary, this movement is effective to decrease the resistance in section A, B of the bridge network with the resultant increase in current flow through the solenoid 46 and a decrease in current flow through the solenoid 45 so that the float 42 is further lowered. The further lowering of the float effects an additional displacement of liquid from the reservoir to effect a repetition of the cycle first described, that is, a further elevation of the valve stem 7 and a further closing of its valve disc 8. Also the bellows 48 will expand further to move the plate 23 and its resistor downward. This cycling or regenerative operation builds up the pressure in the boiler to its final value which is a function of the change in the position of the contactor 32. It is obvious that by placing the pivot of the lever 49 at point 50A instead at 50, a certain amount of "overshoot" can be given to the valve disc, particularly on a temperature increase, by supplying an excessive amount of current to the solenoid 46 and thereafter reducing it in keeping with the response experienced by the valve stem since the position taken by the bellows 11 is a function of the vapor pressure developed therein.

The modified form of the invention shown in Fig. 3 is similar to the arrangement shown in Fig. 1, except that provision is made for effecting a second response for a resetting of the control point. Structurally this arrangement differs from that of the first mentioned figure, in that an expansible metal bellows 55 is connected to the boiler 11 by a capillary tube 56 having therein a coil 57 to restrict the passage of fluid therethrough. The projection on this bellows engages an intermediate point on the lever 58 which is adjustably pivoted at 59 on a portion of the frame 6. A second lever adjustably pivoted at 61 on the bracket, has its free end connected to the free end of the lever 58 by a link 62. An extension on the plate 23 is pivotally connected to this link. The lever 25 which it will be recalled is pivotally connected at one end to the valve stem 7 and adjustably pivoted as at 64 to the portion 19 of the bracket, has its intermediate point 65 connected by a link 63 to an intermediate point of the lever 60.

In the operation of this modified arrangement let it be assumed that there is an increase in temperature of the bulb 18. The liquid in this bulb causes the bellows 16 to expand and this, in turn, swings the lever 26 clockwise. The contactor 32 insulatedly mounted on this lever is moved upward with respect to the resistor 24, thereby decreasing the resistance in the circuit of the heater 33 mounted in the boiler. The increased heat in the boiler vaporizes some of the liquid therein and the bellows 10 elevates the valve stem extension 9 and the valve stem 7 upward against the action of the spring 13 to close the valve disc 8 (not shown). As previously described the increase in vapor pressure in the boiler forces the liquid through the capillary 56 into the bellows 55, the transmission of this liquid being delayed by the resistance 57 in the capillary tube 56. When the bellows 55 thus expands, it moves the free end of the lever 58 downward in clockwise direction. This movement, in turn, lowers one end of the link 62 which lowers the plate 23 and its resistor with respect to the contactor 32. This in effect further reduces the resistance in the circuit of the heater enabling more current to flow therethrough and thereby increase the amount of heat in the boiler. A further increase in vapor pressure in the boiler is thereby effected to cause further elevation of the valve stem extension 9 and the valve stem 7 to close the valve disc 8 (not shown), a further amount thus effecting a so-called second response. This action of recycling continues until the desired temperature condition is restored at the bulb 18.

As soon as the valve stem 7 is initially elevated it elevates the left end of the lever 25. This lever, in turn, operates through the link 63 to elevate the free end of the lever 60. Lever 60 thus elevates the righthand end of the link 62 to elevate the plate 23 on which the resistor 24 is mounted so that the resistance in the circuit of the heater 33 is increased, tending to reduce the amount of heat supplied to the boiler.

The operation just described may be analyzed as including a prompt movement of the valve stem 7 caused by the initial increased heat of the boiler necessary to volatize additional liquid therein and to raise the temperature of the several parts. As the valve stem was elevated in its initial movement, the supply of heat to the boiler was immediately reduced a slight amount since it was only necessary to maintain the temperature of the parts against radiation and convection together with a certain small amount of heat conduction. Following this initial prompt movement and the correcting action there is a subsequent slow drift upwards of the valve stem due to the second response or recycling effect caused by the liquid flowing through the capillary tube 56 into the bellows 55. The expansion of the bellows 55 causes an additional amount of heat to be introduced into the boiler to bring about the slow upward drift of the valve stem.

It will be understood that if the pivot 64 is adjusted to a point at the left of point 65, the operation of the regulator is changed slightly. For example, when the valve stem 7 rises, the lever 25 swings clockwise about pivot 65 so that its righthand end, to which link 63 is connected, is lowered. This results in the lowering of the righthand end of link 62, which in turn lowers the plate 23 to decrease the resistance in the circuit of the heater. The heater is thus caused to vaporize more of the liquid in the boiler to effect a further upward movement of the valve stem 7. By this last-mentioned adjustment, not only the movement of the bellows 55 but also the movement of the lever 25 and its related mechanism are effective to cause additional movements of the valve stem in the same direction as its original movement. This in effect comprises two second responses supplementing the original response.

In the fragmentary showing of Fig. 4 there is illustrated an attachment which may be added to the constructions shown in Figs. 1 and 3, in order to effect a more positive adjustment of the valve disc even when a relatively large amount of friction is present. In this attachment there is provided a link 70 pivotally connected at one end to the frame 19 and at its other end to the valve stem 7. An arm 71, which is pivoted at one end to an intermediate point on the lever 70, is provided at its other end with contact springs 72 and 73, the contact spring 73 normally making contact with the movable contactor or brush 32. It will be noted that when the attachment is in its normal condition, that is, when the contact spring 73 engages the contactor 32, the resistor A is short circuited. If, however, the bulb 18 (Figs. 1 and 3) is subjected to an increase in temperature, the contactor 32 descends, pushing the contact spring 73 into engagement with the contact spring 72 so that not only the resistor A, but the resistor B is short circuited. This results in a comparatively large increase in current flowing through the heater 33 so that a large amount of vapor pressure is developed in the boiler 9, which pressure will be more than enough to move the valve stem against friction encountered in use. When the predetermined condition is restored, contact spring 73 will engage contactor 32 but will be out of engagement with the contact spring 72.

If, however, the temperature at bulb 18 drops, the contactor 32 will be elevated so that it is out of engagement with contact spring 73. This eliminates the short circuit about the resistor A so that there is a relatively large reduction in the current passing through the heater 33 and a consequent reduction of the pressure in the boiler. The spring 13 is thus enabled to act more positively to overcome the friction present. The system in which this arrangement is used is, of course, carefully adjusted to prevent "overshooting" the predetermined control point.

I claim:

1. In a regulating device, an adjustable member for governing the application of a regulating medium to maintain a predetermined condition, means for operating said member, said means including a boiler having therein a vaporizable liquid and its vapor, mechanism responsive to a deviation in said condition for varying the relative amounts of said liquid and said vapor as a function of said deviation whereby said member is moved according to a function of said deviation, and means controlled in response to the movement of said member for further varying the relative amounts of said liquid and said vapor whereby an additional movement of said member is effected.

2. In a regulating device, an adjustable member for governing the application of a regulating medium to maintain a predetermined condition, a motor for operating said member, said motor including a boiler having therein a vaporizable liquid and its vapor, mechanism responsive to a deviation in said condition for varying the relative amounts of said liquid and said vapor as a function of said deviation whereby said member is moved according to a function of said deviation, and means controlled in response to the movement of said member for further varying the relative amounts of said liquid and said vapor whereby an additional movement of said member is effected in the same sense.

3. In a regulating device, an adjustable member for governing the application of a regulating medium to maintain a predetermined condition, a motor for operating said member, said motor including a boiler having therein a vaporizable liquid and its vapor, mechanism responsive to a deviation in said condition for varying the relative amounts of said liquid and said vapor as a function of said deviation whereby said member is moved according to a function of said deviation, and means controlled in response to the movement of said member for further varying the relative amounts of said liquid and said vapor whereby an additional movement of said member is effected in the opposite sense.

4. In a regulating device, an adjustable member for governing the application of a regulating medium to maintain a predetermined condition, a motor for operating said member, said motor including a boiler having therein a vaporizable liquid and its vapor, a heater associated with said boiler for effecting the vaporization of said liquid, means for varying as a function of a deviation in said condition the amount of heat supplied by said heater whereby the relative amounts of said liquid and said vapor are varied as a function of said deviation and whereby said member is moved proportionately to said deviation, and means controlled in response to the movement of said member for further varying the heat supplied by said heater so that the relative amounts of said liquid and said vapor are changed again and another movement of said member is effected.

5. In a regulating device, an adjustable member for governing the application of a regulating medium to maintain a predetermined condition, a motor for operating said member, said motor including a boiler having therein a vaporizable liquid and its vapor, an electric heater associated with said boiler for effecting the vaporization of said liquid, a source of current, means for varying as a function of said deviation the current supplied to said heater whereby the relative amounts of said liquid and said vapor are varied as a function of said deviation and whereby said member is moved proportionately to said deviation, and means controlled in response to the movement of said member for further varying the current supplied to said heater whereby the relative amounts of said liquid and said vapor are further changed and additional movement of said member is effected.

6. In a regulating device, an adjustable member for governing the application of a regulating medium to maintain a predetermined condition, a motor for operating said member, said motor including a boiler, a reservoir having a liquid therein and communicating with said boiler, a heater supplying a substantially fixed amount of heat to said boiler for effecting vaporization of the liquid, means for changing as a function of a deviation in said condition the amount of the liquid supplied to said boiler from said reservoir whereby a change occurs in the pressure in said boiler and the member moves accordingly, and means controlled by the pressure of said boiler for further varying the amount of liquid supplied to said boiler from said reservoir, whereby a further pressure change results and a further movement of said member is effected.

7. In a regulating device, an adjustable member for governing the application of a regulating medium to maintain a predetermined condition, mechanism for operating said member, said mechanism including a boiler having therein a vaporizable liquid and its vapor, a heater associated with said boiler for effecting the vaporization of said liquid, means for varying as a function of said deviation the amount of heat supplied by said heater whereby the relative amounts of said liquid and said vapor are varied as a function of said deviation and whereby said member is moved proportionately to said deviation, and means controlled in response to the movement of said member for governing the relative amounts of said liquid and said vapor whereby said member is moved until it is correctly positioned to maintain said condition.

WILLIAM M. YOUNG.